L. RAECKE,

Assignor, by mesne assignments, to M. LANSBURGH.

Filter.

No. 8,894. Reissued Sept 16, 1879.

Witnesses:

A. M. Bright.

F. O. McCleary.

Inventor

Louis Raecke.

Per H. A. Seymour. Attorneys.

N. PETERS, PHOTO-LITHOGRAPHER, WASHINGTON, D. C.

UNITED STATES PATENT OFFICE.

LOUIS RAECKE, OF NEW YORK, N. Y., ASSIGNOR, BY MESNE ASSIGNMENTS, TO MAX LANSBURGH, OF SAME PLACE.

IMPROVEMENT IN FILTERS.

Specification forming part of Letters Patent No. 111,001, dated January 17, 1871; antedated January 7, 1871; Reissue No. 8,894, dated September 16, 1879; application filed July 26, 1879.

*To all whom it may concern:*

Be it known that I, LOUIS RAECKE, of the city, county, and State of New York, have invented certain new and useful Improvements in Filters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in filters, the object being to provide a filter through which the liquid may pass through the filtering material with or without pressure, and in a heated or unheated state, and any portion of the liquid be prevented from finding a passage along the walls of the vessel or receptacle and out of the sieve in an unfiltered state.

My invention consists, first, in a filter provided with a foraminated exit located and arranged in such relation to the filter that the liquid which flows down along the walls of the filter will be caused to flow inwardly through the filtering medium and toward and through such foraminated exit or discharge.

My invention further consists in a filter provided with a flange located between the wall or inner surface of the filter and the sieve or liquid-discharge openings, whereby the liquid which flows down along the walls of the filter will be caused to flow inwardly through the filtering medium and over said intervening flange before it reaches the discharge-openings.

My invention further consists in a filter constructed with an annular chamber for filtering medium, located between the wall or inner surface of the filter receptacle or vessel and the sieve or discharge-opening, whereby the filtering medium may be tightly packed in said chamber and cause the liquid that flows down along the walls of the filter to become thoroughly filtered.

My invention further consists in a filter provided with a filtering-diaphragm, located in the upper portion of the filter-receptacle, and a flange, located between the wall or inner surface of the filter and the discharge-opening from the receptacle for the filtering medium.

Figure 1:
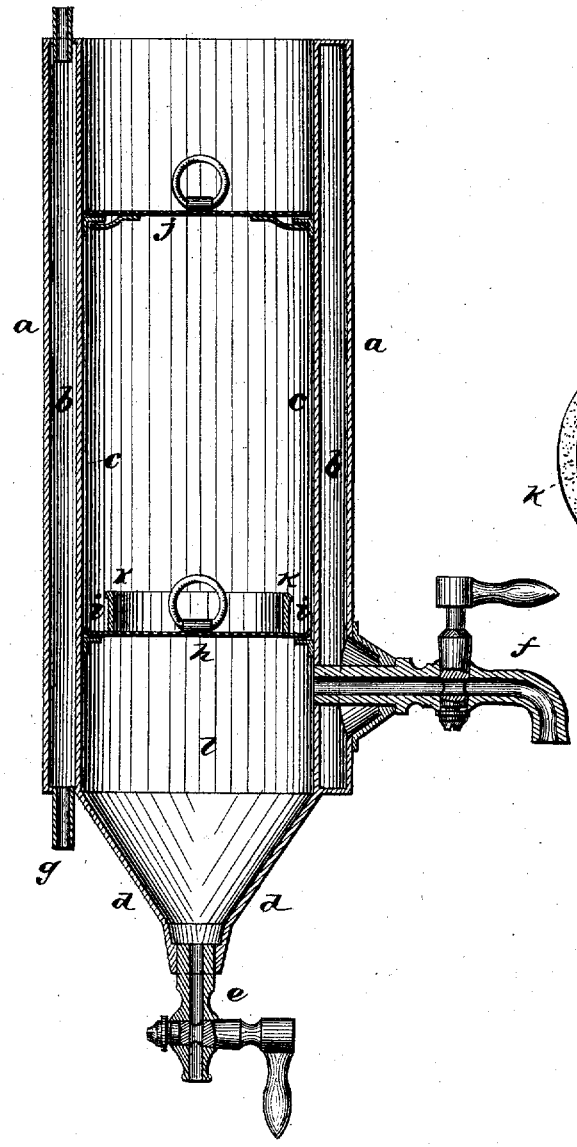
Figure 2:
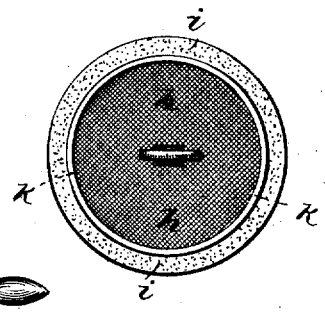

In the accompanying drawings, Figure 1 is a vertical section of a filter embodying my invention. Fig. 2 is a plan view of the lower sieve and flange.

C represents the filtering-vessel containing the sieves and filtering medium, the lower extremity of which is provided with a conical receptacle, *a*, for the reception of such liquid as may be found to be impure after passing through the filter. Sometimes the filtering material, even though new or freshly washed, will contain, and impart to the liquid passing through it, impurities. In such case this impure liquid may be allowed to run down into the conical receptacle and pass out of the faucet *e* in the apex of the conical receptacle.

If it is desired to heat the liquid to be filtered, the filtering-vessel *c* is surrounded by an outer cylinder or vessel, *a*, which latter should be made so much larger than the filtering-vessel that the intervening annular space *b* between the two will hold water or steam sufficient to impart to the liquid to be heated the necessary degree of heat.

Within the filtering-vessels are placed the sieves *h* and *j*. Sieve *j*, located nearest the top of the vessel, rests upon a support connected with the inner wall of the vessel, and may be fastened with hooks, or buttons, or other devices. The other sieve or foraminated exit, *h*, is placed in the lower portion of the filtering-vessel, and rests upon a support fixed in the walls of the cylinder.

A stiff flange, K, is fixed to the inner portion of the imperforate rim or flange of the sieve, and concentric with its outer edge. Flange K is arranged at right angles to the surface of the rim encircling the sieve, and must be sufficiently stiff to bear the pressure occasioned by densely packing the filtering material in the annular space *i*, between it and the wall or inner surface of the filtering-vessel. The space between the sieves *j* and *h* is filled with filtering material, which is packed with sufficient density to insure the purification of the liquid passed through, and at the same time not to interfere with its free passage.

A valuable and important feature of my invention is the construction and arrangement of parts whereby the filtering material may be packed in that part of the space *i* which lies between the flange K and the walls of the cylinder. One difficulty of frequent occurrence in filtering is the tendency of the fluid to find a passage along the walls of the vessel and out of the sieve in an unfiltered state. I obviate this by packing the space *i* very closely with the filtering material—so closely that though the fluid to be filtered may, and probably will, run down along the walls of the cylinder in an unfiltered condition, yet, when it comes to this point, it will be and is forced by the density of the packing to pass away from the walls and pass inwardly through the filtering material over the flange K to the discharge-opening, and come out pure, drawn with the rest of the liquor through the faucet *f*, provided for that purpose.

It will thus be observed that the liquid to be filtered is prevented from flowing down the walls of the filtering-vessel and escaping in an unfiltered and unpurified state, as that portion of the liquid flowing down the walls of the filtering-vessel is caused to pass away from the walls of the filtering-vessel and flow inwardly through the filtering material and over the flange before the liquid reaches the foraminated exit.

If the substance to be filtered requires to be softened or made thinner by an increased temperature, then hot water or steam can be applied, in any convenient manner, between the inner and outer walls. When this is not required, the inner or filtering vessel can be used without the outer case.

The size of the flange and the distance it is placed from the wall of the cylinder must be adjusted to the size of the filter. In a filter fifteen inches high and six inches in diameter, I make the flange about one and one-quarter inch high, and place it an inch from the side of the cylinder. If the filter is larger, the flange and space should be altered accordingly.

*g* is a faucet for drawing hot water from the space between the two vessels.

Having fully described my invention, what I claim as new, and desire to secure by Letters Patent, is—

1. A filter having filtering material packed in an annular chamber formed by a flange located between the wall or inner surface of the filter and sieve or foraminated exit through which the liquid flows from the filtering-vessel, whereby the liquid that flows along down the walls of the filter is caused to flow inwardly and away from the inner surface of the filter and through the filtering medium before it reaches the foraminated exit, substantially as and for the purpose set forth.

2. A filter provided with a filtering-diaphragm, located in the upper portion of the filter, and an annular chamber in which filtering material is packed, located between the wall or inner surface of the filter and the sieve or foraminated exit, through which the liquid flows as it escapes from the receptacle in which the filtering material is packed, substantially as set forth.

In testimony that I claim the foregoing I have hereunto set my hand and seal this 23d day of July, 1879.

LOUIS RAECKE. [L. S.]

Witnesses:
EDW. S. EVARTS,
LOUIS SCHUMACHER.